United States Patent [19]

Forest et al.

[11] Patent Number: 5,105,283
[45] Date of Patent: Apr. 14, 1992

[54] PRODUCTION OF SIGNATURES FROM DOCUMENTS STORED IN ELECTRONIC MEMORY

[75] Inventors: Paul H. Forest, Rochester; Frank L. Muster, Fairport, both of N.Y.

[73] Assignee: Eastman Kodak Company, Rochester, N.Y.

[21] Appl. No.: 424,633

[22] Filed: Oct. 20, 1989

[51] Int. Cl.$^5$ .............................................. H04N 1/00
[52] U.S. Cl. ..................................... 358/401; 358/444; 358/450; 358/452
[58] Field of Search ............... 358/403, 444, 448, 450, 358/452, 401, 442; 355/24, 25, 202; 364/523; 382/44, 41, 42, 1

[56] References Cited

U.S. PATENT DOCUMENTS

| | | | |
|---|---|---|---|
| 4,672,462 | 6/1987 | Yamada | 358/401 |
| 4,727,402 | 2/1988 | Smith | 355/14 |
| 4,910,612 | 3/1990 | Yamazaki | 358/444 |

*Primary Examiner*—Edward L. Coles, Sr.
*Attorney, Agent, or Firm*—Milton S. Sales

[57] ABSTRACT

Reproduction apparatus is provided for producing signatures from electrical signals representive of the image content of a plurality of originals to be produced on receiver sheets. The reproduction apparatus includes a multi-image electronic memory having addressable regions for storing such electrical signals defining the image content of a plurality of originals in a first sequence of originals. The address information relating to the storage location of each original is stored in the memory. The stored electrical signals of individual originals are selectively retrieving from the memory in a scheduled order different from said first sequence such that reproduced images of the originals are located on respective sides of receiver sheets in regions such that multiple stacked receiver sheets can be folded between images and nested to form a collated booklet with the pages properly sequenced. A writer produces the original images onto receiver sheets in the order the control information is retrieved from the memory.

4 Claims, 7 Drawing Sheets

PRODUCTION OF SIGNATURES FROM DOCUMENTS STORED IN ELECTRONIC MEMORY

BACKGROUND OF THE INVENTION

1. Technical Field

This invention relates generally to reproduction apparatus for automatic production of signatures from individual ordered originals for the formation of booklets.

2. Background Art

A signature is a sheet containing plural printed pages arranged such that when the sheets are folded and nested in a set, one inside the other, they become one collated booklet. Normally, documents are presented to copiers and printers in page number order, and with only one page on each sheet face. It is generally intended to create booklets having the same page order. However, if the booklets are formed from folded and nested sheets which each carry four page images (two on the front and two on the back) in their original page sequence, the booklets would contain page images in an illogical order.

Accordingly, it is known that a non-sequential placement of images on each signature is essential to providing a finished booklet with a direct sequential page order. Most prior art signature copy production systems require manual page reordering which is relatively complex and not easily understood or used by the typical casual operator.

U.S. Pat. No. 4,727,402, which issued to R. E. Smith on Feb. 23, 1988, discloses an automatic original document sheet reordering technique for input documents in the production of signatures to form booklets with a copier. An automatic duplexing copier simultaneously presents plural original document sheets to an imaging station in a predetermined, nonserial page order. A normal serial set of original document sheets are loaded into an automatic document reordering and presenting system for presentation to the imager. The Smith system requires repeated recirculation of the original documents through a recirculating document handler until the proper page order is obtained. This is both time consuming and subject to a greatly increased risk of paper jams in the document handler due to the large number of times that the original documents must recirculate through the handler.

DISCLOSURE OF INVENTION

It is an object of the present invention to provide reproduction apparatus for automatic production of signatures from individual ordered originals for the formation of booklets wherein the originals need be handled only once.

It is another object of the present invention to provide reproduction apparatus for automatic production of signatures from individual ordered originals for the formation of booklets wherein the originals need not be taken out of their normal direct sequential serial page order.

In accordance with these and other objects, reproduction apparatus is provided for producing signatures from electrical signals representative of the image content of a plurality of originals to be produced on receiver sheets. The reproduction apparatus includes a multi-image electronic memory having addressable regions for storing such electrical signals defining the image content of a plurality of originals in a first sequence of originals. The address information relating to the storage location of each original is stored in the memory. The stored electrical signals of individual originals are selectively retrieving from the memory means in a scheduled order different from the first sequence such that reproduced images of the originals are located on respective sides of receiver sheets in regions such that multiple stacked receiver sheets can be folded between images and nested to form a collated booklet with the pages properly sequenced. A writer is provided for producing the original images onto receiver sheets in the order that the control information is retrieved from said memory.

In accordance with another aspect of the present invention, booklet production apparatus includes image memory means for storing electrical signals representative of a plurality of original pages. Means are provided for causing the electrical signals to be stored in the memory means in a first sequence. Means are also provided for controlling the reading out of stored data and for providing the electrical signals to image forming means in a sequence different from the first sequence such that at least two page images are produced on a receiver sheet in respective arrangement of images so that, when nested, the receiver sheets can be folded so as to read like a book with the pages properly sequenced.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

In this specification, the term "copier" is meant to refer to apparatus arranged for reading the image information on an original hard copy and for reproducing such image information on a receiver sheet. The term "printer" is meant to refer to apparatus arranged for receiving image information in other than hard copy form and for reproducing such image information on a receiver sheet. The term "original" is meant to refer to image information to be reproduced, whether such image information is in hard copy, electronic, or other form. The term "reproduction apparatus" is meant to refer to copiers and/or printers.

Figure 1:
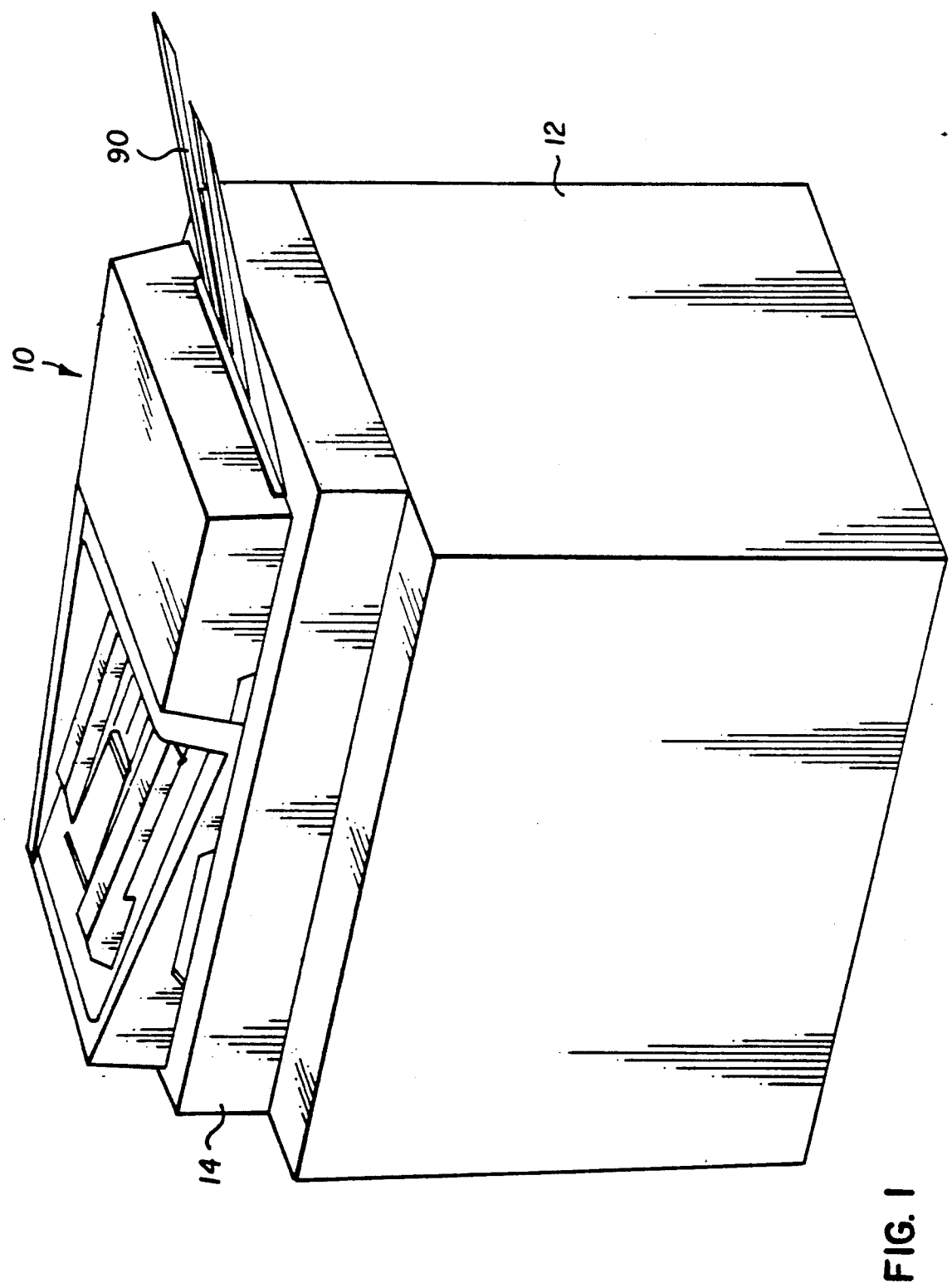
FIG. 1 is a perspective view of reproduction apparatus according to the present invention.
Figure 2:
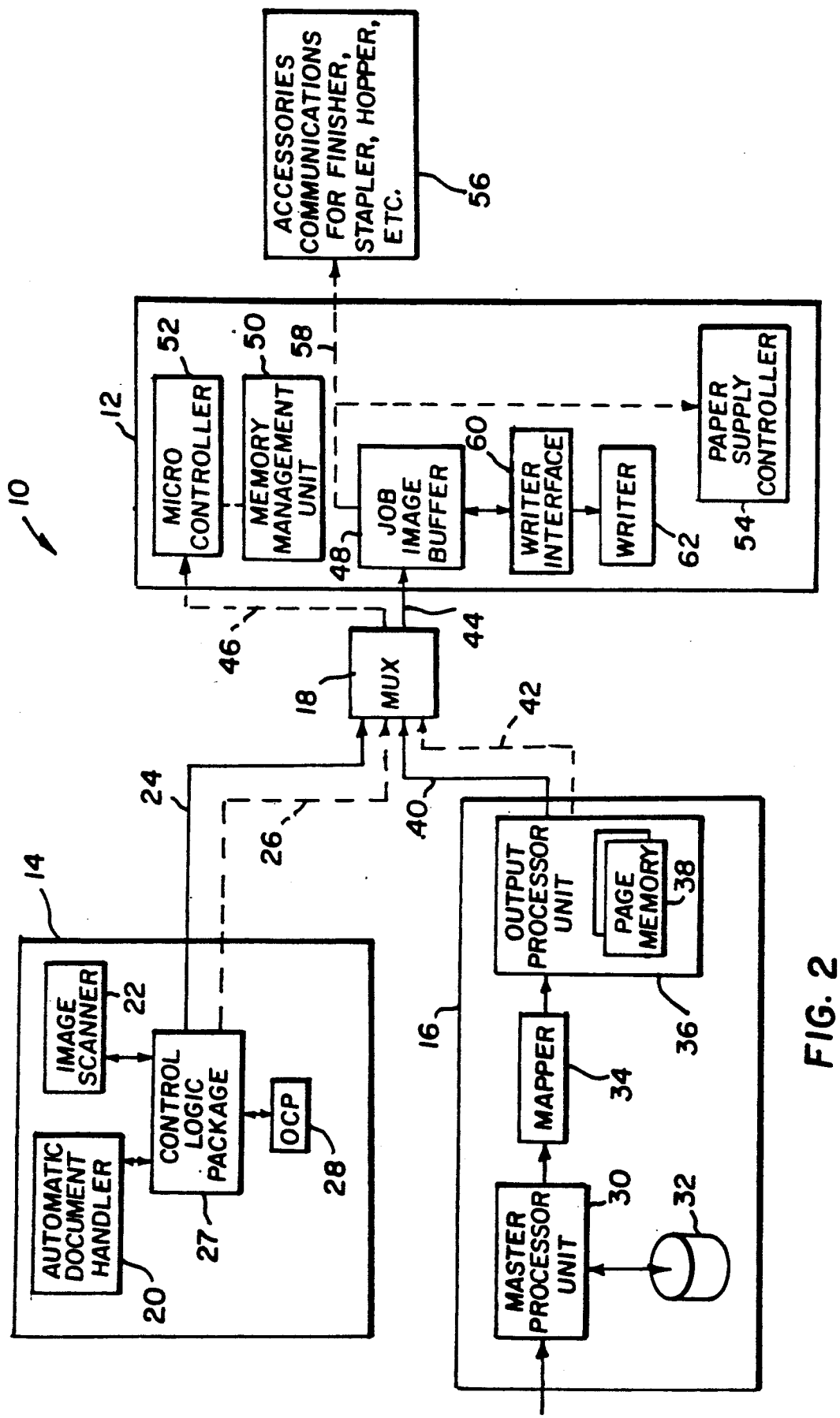
FIG. 2 is a schematic block diagram of reproduction apparatus of FIG. 1.

According to FIGS. 1 and 2, reproduction apparatus 10 includes a marking engine 12, a scanner 14, a raster image processor 16, and a multiple input controller 18 for selecting the input to the marking engine.

An original document reader such as scanner 14 is arranged for producing a series of electrical signals representative of the image content of originals. Scanner 14 consists of an automatic document handler 20 for stream feeding multiple hard copy original pages to be automatically read by an image scanner 22 such as a linear array of solid-state charge-coupled devices. The solid state device scans the original pages, converting their images to a series of electrical signals in page format for input to marking engine 12. The image data is transmitted along an image data bus 24 to multiple input controller 18. Synchronization signals to identify separate scan lines and to provide page information and marking engine control is transmitted along a job control communications link 26.

Scanner 14 includes a control logic package 27 having an operator control panel 28 for the operator to input functions and to receive messages from the reproduction apparatus. Setup instructions are input to the scanner, while information for finishing and processing of jobs will be sent to marking engine 12. The logic package consists of control software, interface software, and logic hardware. Functions inputted by the operator at the control panel include a booklet mode, to be explained in detail below.

Raster image Processor 16 includes a master processor unit 30 which receives high level commands and data in character code form from a main frame computer, network link, data processing work station, removable memory media, FAX, or the like. The commands are translated into machine control language by the master processing unit. A job buffer 32 stores incoming jobs and program codes for use by the master processing unit.

After interpreting a job, master processing unit 30 parcels the job to a mapper 34, which converts the character code data to a pixel pattern map. For color prints, the mapper separates the information into four raster patterns; one for each color available at marking engine 12.

When the pixel pattern map is rasterized, mapper 34 sends page information to an output processor unit 36. The output processor unit has page memory 38, which stores image planes for transmission to marking engine 12.

The processed image data is transmitted along an image data bus 40 to multiple input controller 18. Synchronization signals to identify separate scan lines and to provide page information and marking engine control is transmitted along a job control communications link 42.

Marking engine 12 receives bit stream image data over a bus 44 and job control data over a communications link 46, both for storage in a multiple page buffer memory 48 under the control of a memory management unit 50. Memory devices may be classified as being either "totally accessible" wherein simultaneous requests for access to two different addresses can be honored, or "not totally accessible" wherein only those addresses in a particular subset can be accessed at the same time. In the embodiment of reproduction apparatus as disclosed herein, the file maintenance problem is not solvable if only one "not totally accessible" memory is used since in normal operation the scanner (or the raster image processor) and the writer will generally not be working out of the same subset. Accordingly, job image buffer should preferably consist of two or more "not totally accessible" memories or at least one "totally accessible" memory.

Control means, including a micro controller 52 is arranged to perform arithmetic and logic operations and instruction decoding as well as controlling the time allocation of peripherals (such as a paper supply controller 54 and accessories 56) through a machine control communications link 58. Several output functions may be available for receiver sheets, including selection of output trays, stapling, sorting, folding, finishing, mailbox, envelope receiver, etc.

After appropriate processing, the data is inputted to a writer interface 60 and a writer 62 for forming images on the receiver sheets.

Figure 3:
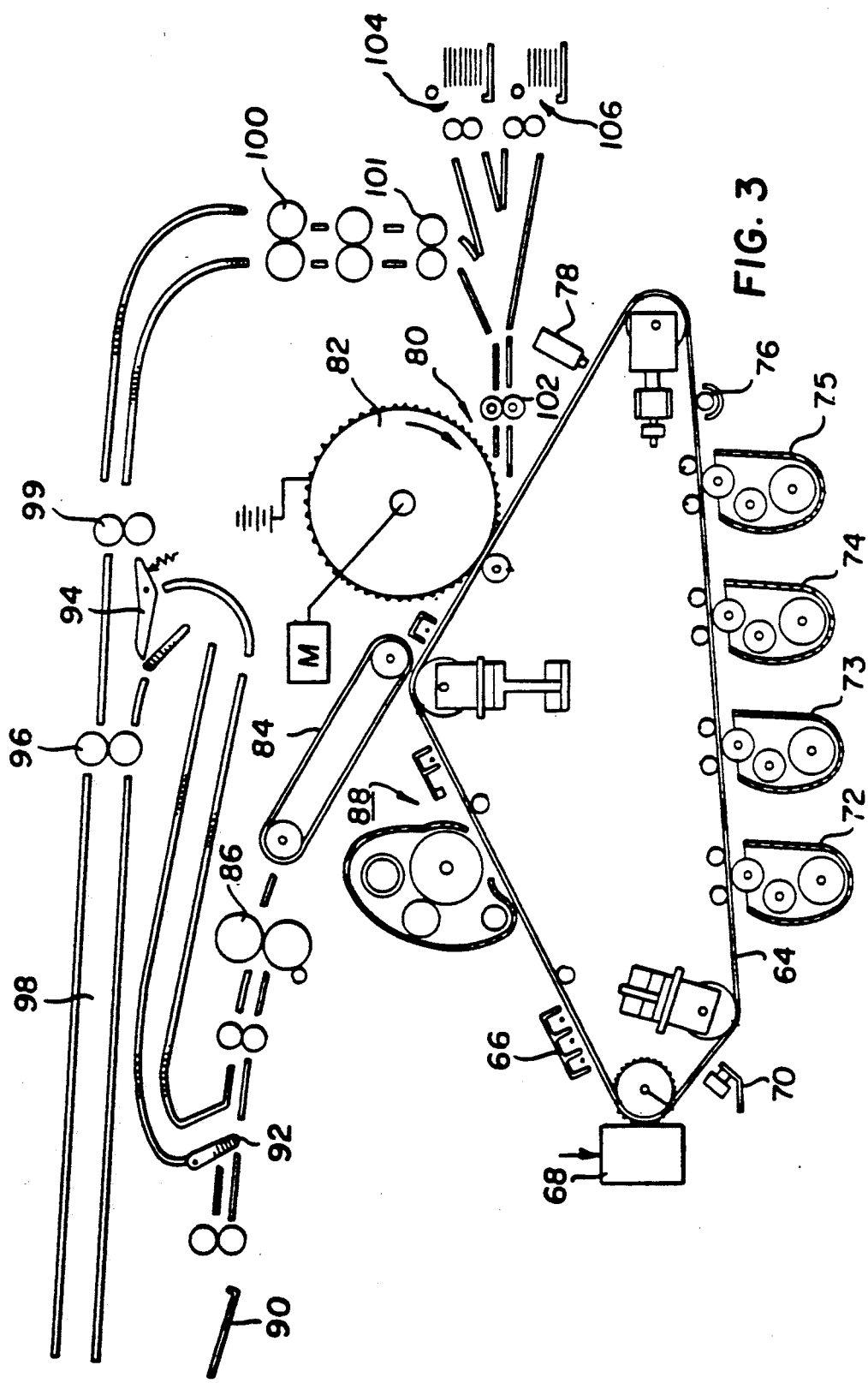
FIG. 3 is a schematic diagram of a multi-color electrostatographic reproduction apparatus.

According to FIG. 3 a film core portion of writer 62 includes an image bearing member, for example, an endless electrophotoconductive web 64 entrained about a series of primary rollers and other supporting structure. Web 64 is driven through a series of electrophotographic stations generally well-known in the art. More specifically, a uniform charge is laid down on the web by a charging station 66. The uniformly charged web moves around one of the rollers, which is directly opposite an LED printhead 68 which LED printhead exposes web 64 in a manner well-known in the art. The web then moves into operative relation with an electrometer 70 which senses the level of a charge existing after exposure of the web by printhead 68, to help control the process.

The web then moves into operative relation with a series of toning or developing stations 72, 73, 74 and 75. Each image created by printhead 68 is toned by one of the toning stations. After being toned the web passes a magnetic scavenger 76 which removes excess iron particles picked up in the toning process. After the electrostatic image has been toned the web passes under a densitometer 78 which measures the density of the toner image also for use in controlling the process. The toner image then proceeds to a transfer station 80 where the image is transferred to a transfer surface of a receiver sheet carried by a transfer drum 82.

As thoroughly discussed in U.S. Pat. No. 4,712,906, consecutive images in different colors are transferred in registry to a receiver sheet. The receiver sheet is wrapped on transfer drum 82 and recirculated on the surface of the drum into transfer relation with the consecutive images to create a multicolor image on the sheets. To improve efficiency, large sheets, for example, "ledger" size sheets are placed on the drum with the small dimension parallel to the axis of the drum and wrapped substantially around the transfer drum. Small sheets, for example, "letter" size sheets are placed with their long dimension parallel to the axis of the drum. Since the short dimension of letter size sheets is approximately half the long dimension of ledger size sheets, two letter size sheets are placed on the drum in approximately the same space as the single ledger size sheet. When the apparatus is operating in a multi-image mode, for example, a multicolor mode, consecutive images or pairs of images are toned with different colored toners using the different toning stations 72-75. These consecutive images are transferred in registry to the receiver sheet as it repeatedly is brought into transfer relation with web 64 by drum 82. After the transfer operation is complete, the receiver sheet is allowed to follow the web, for example, by removing the vacuum holding it to drum 82 or by stripping the sheet with a skive, other conventional stripping mechanism, or both. The receiver sheet is separated from the web with the aid of an electrostatic sheet transport mechanism 84 and is transported to a fuser 86. The web is then cleaned by the application of a neutralizing corona and a neutralizing erase lamp and a magnetic brush cleaning mechanism all located at a cleaning station 88.

After the receiver sheet leaves fuser 86 it can go directly to an output tray 90 or be deflected by a deflector 92 into a duplex path according to the position of deflector 92, the position of which is controlled by the logic of the apparatus through means not shown. The duplex path moves the sheet by rollers and guides directing it first through a passive deflector 94 into turn-around rollers 96. Turn-around rollers 96 are independently driven to drive the receiver sheet into turn-around guide means 98, until the trailing edge thereof has been sensed by an appropriate sensor, not shown, to have passed passive deflector 94. Once the trailing edge has passed passive deflector 94, turn-around rollers 96 are reversed and the receiver sheet is driven by rollers 96 and other sets of drive rollers 99, 100, and 101 back to a position upstream of transfer station 80. The receiver sheet can pass through registration mechanisms for correcting for skew, crosstrack misalignment and in-track misalignment and ultimately stop at timing rollers 102.

Transfer station 80 receives sheets from any of three sources. First, it can receive sheets of one particular size from a first supply 104, which first supply may include, for example, letter size sheets being fed with their short dimension parallel with the direction of feed. Second, it may receive sheets from a second supply 106, which, for example, may include ledger size sheets with their long dimension parallel to the direction of movement. Third, the transfer station may receive sheets from the duplex path which may include either size sheet and would already contain a fused image on its upper side. The receiver sheets from whatever source, stop against timing rollers 102. In response to a signal from the logic and control of the apparatus, not shown, timing rollers 102 accelerate to drive the receiver sheet into the nip between transfer drum 82 and the web as the first toner image to be transferred approaches the nip.

The duplex path is of a length that takes multiple sheets at one time depending on the length of the sheets. For example, four letter size sheets may be in the duplex path at one time or two ledger size sheets. If the printer is printing different images on different sheets, the logic and control of the apparatus must supply the necessary programming to the exposure and toning stations so that the sheets ultimately fed to output tray 90 are in the correct order considering the number of sheets that must be in the duplex path.

Figure 4:
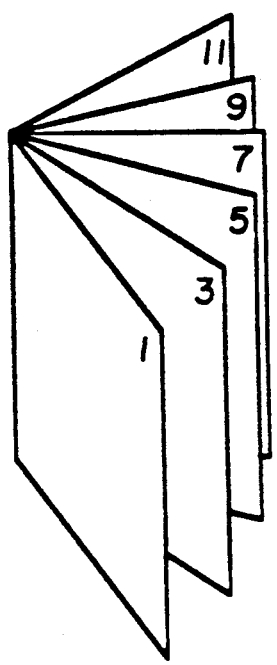
FIG. 4 is a perspective illustration of a 12 page booklet.
Figure 5:
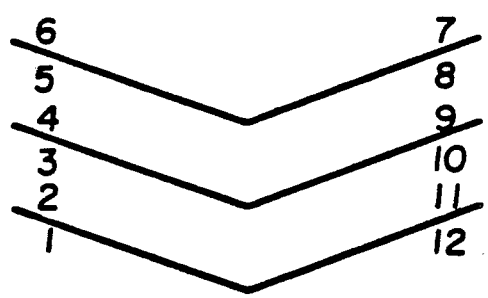
FIG. 5 is an exploded top view of the booklet shown in FIG. 4.
Figure 6:
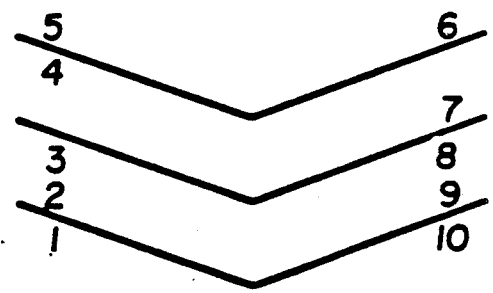
FIG. 6 is an exploded top view of a booklet similar to that of FIGS. 4 and 5, but produced in chapters.

As an example of the functions of the elements described, it will be assumed that an operator desires to make eight collated sets of signatures of an original made up of, say, twelve pages stacked in automatic document handler 20 such that the sheets can be bound and folded in the center so as to read like a book with the pages properly sequenced as illustrated in FIGS. 4 and 5. At this point, it will be noted that pages can be arranged consecutively as shown in FIG. 5, or in chapters such that the first page of a new chapter begins on the right most page as viewed from the reading vantage as illustrated in FIG. 6. The operator sets control panel 28 accordingly. For purposes of this example, it will further be assumed that job image buffer 48 is fully capable of storing the information from at least the twelve original pages.

Now, control logic package 27 starts in a subroutine pre-programmed according to the switches on control panel 28 to command scanner 14 to begin operation. Automatic document handler 20 is activated to move a document into an exposure station of image scanner 22.

As the scanning progresses, data (including image information and control signals) are received by job image buffer 48. As subsequent original documents are scanned, the processes described above are repeated until all of the original documents have been scanned and the data therefrom stored in job image buffer 48.

One function of multiple-page image buffer 48 is to store all the pages of a particular job so that plural sets of collated pages may be produced without re-scanning the set of originals for each set produced. As such, automatic document handler 20 need not be capable of recirculating the originals.

Figure 7:
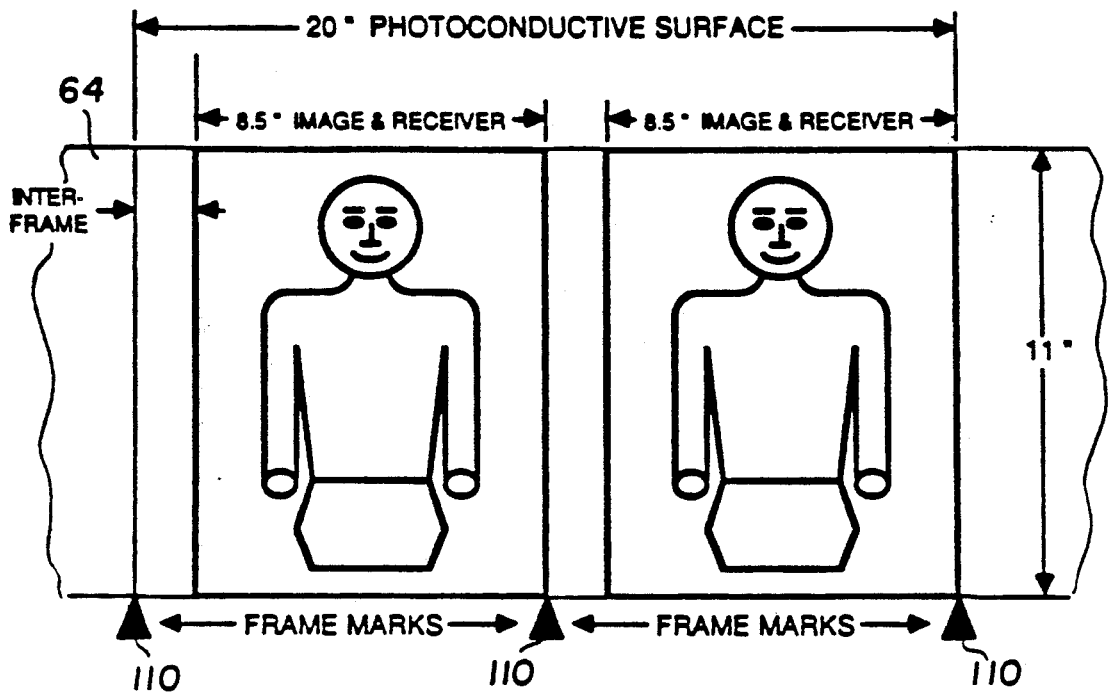
FIG. 7 is a view of a photoconductive web indicating the position of letter-sized image areas thereon.
Figure 8:
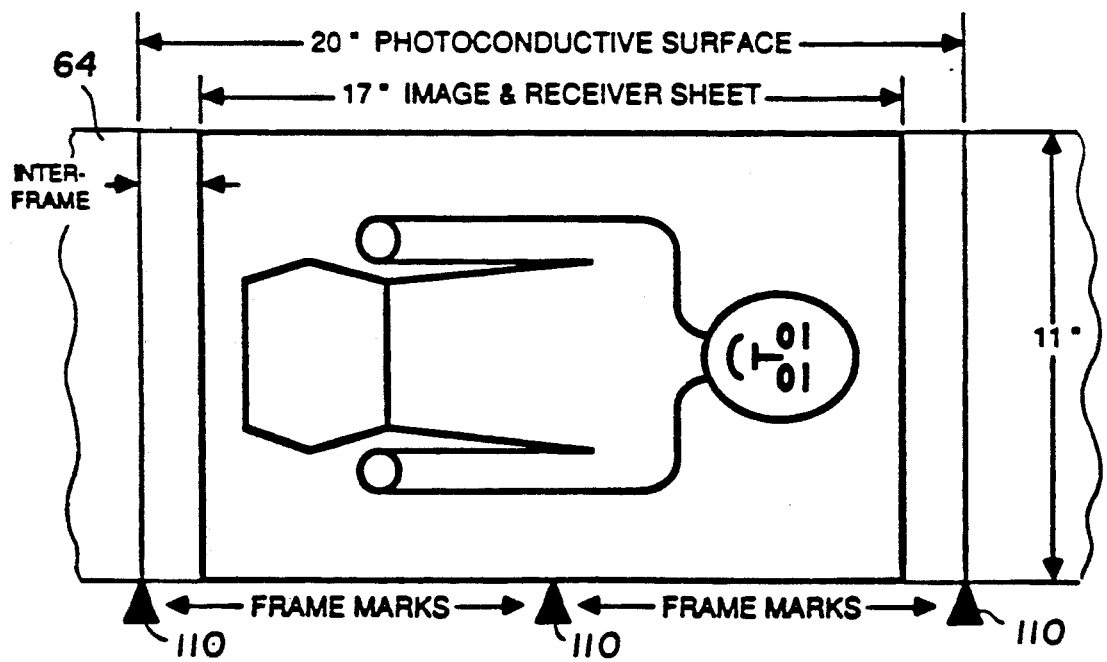
FIG. 8 is a view of a photoconductive web indicating the position of a ledger-sized image area thereon.

Referring to FIGS. 7 and 8, in a "standard" mode of operation, the latent images are aligned on web 64 such as to allow an orderly repetitive process of exposure and transfer to receiver sheets. Both letter (FIG. 7) and ledger (FIG. 8) documents are sequentially imaged onto the photoconductive surface with consistent reference to frame marks 110. For purposes of illustration, it has been assumed that the original is $8\frac{1}{2} \times 11$ inches and that the receiver sheet is $11 \times 17$ inches. Other formats would of course be within the scope of this invention. The space that is present between the image area and the frame mark is known as the interframe. FIGS. 9-12 illustrate several different arrangements of images on the photoconductor for the booklet mode of the present invention.

Figure 9:
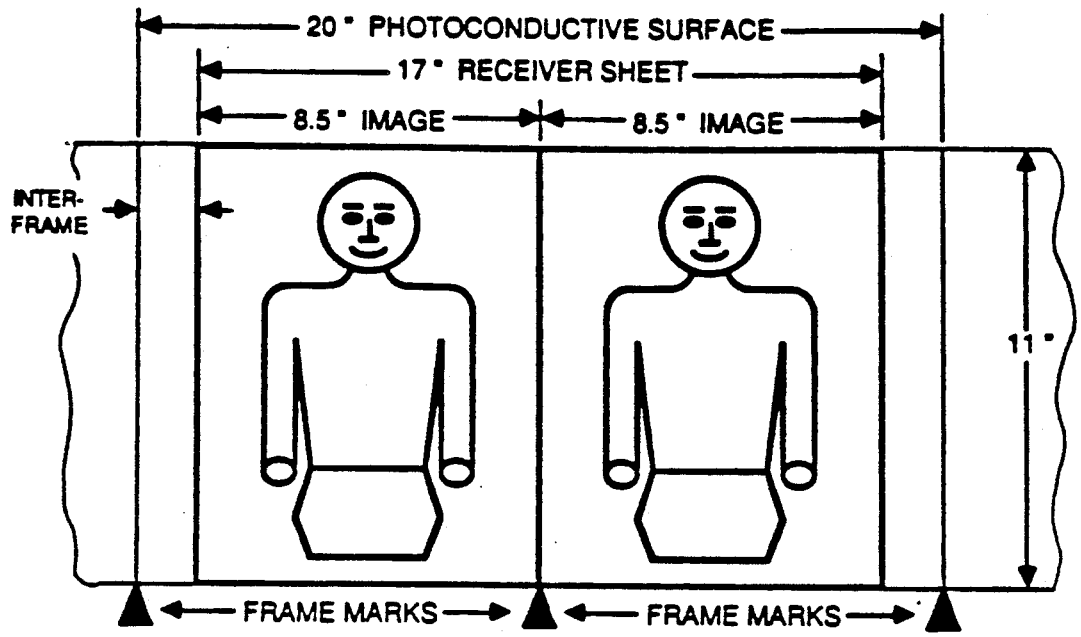
FIGS. 9–12 are views of a photoconductive web indicating the position of letter-sized or reduced letter-sized image areas thereon.
Figure 10:
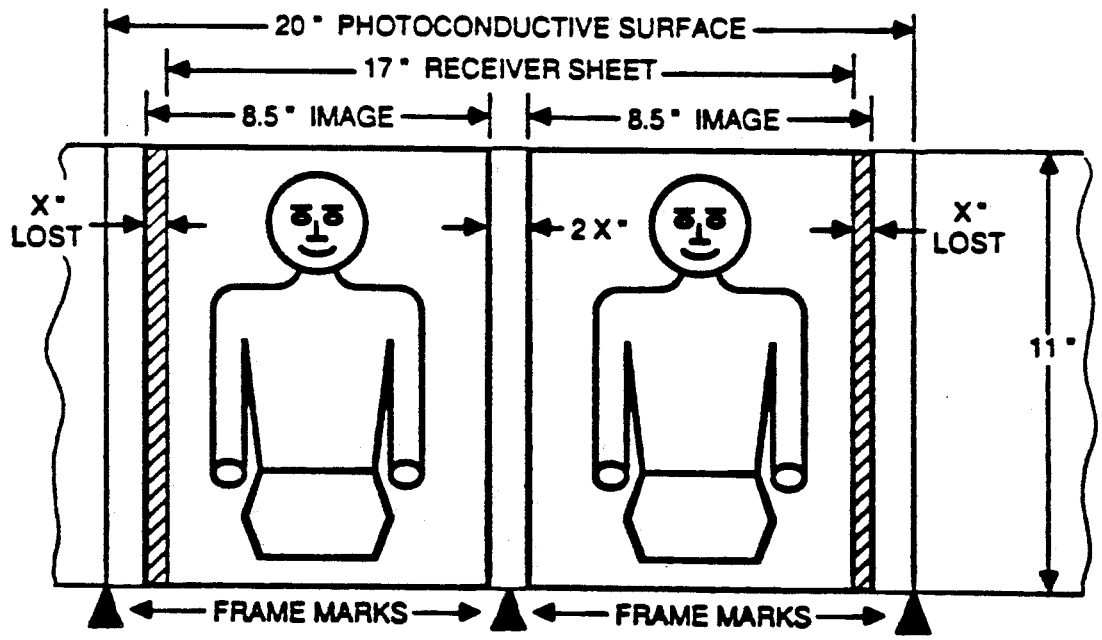

FIG. 9 shows the images aligned without separation. This requires that one of the images be shifted toward the other image by the distance of one interframe. FIG. 10 shows the images arranged with a separation equal to a distance "2X". This requires that both images be shifted on the photoconductor by the distance "X" relative to the frame marks, and will result in a loss of printable image by the distance "X", as shown.

Figure 11:
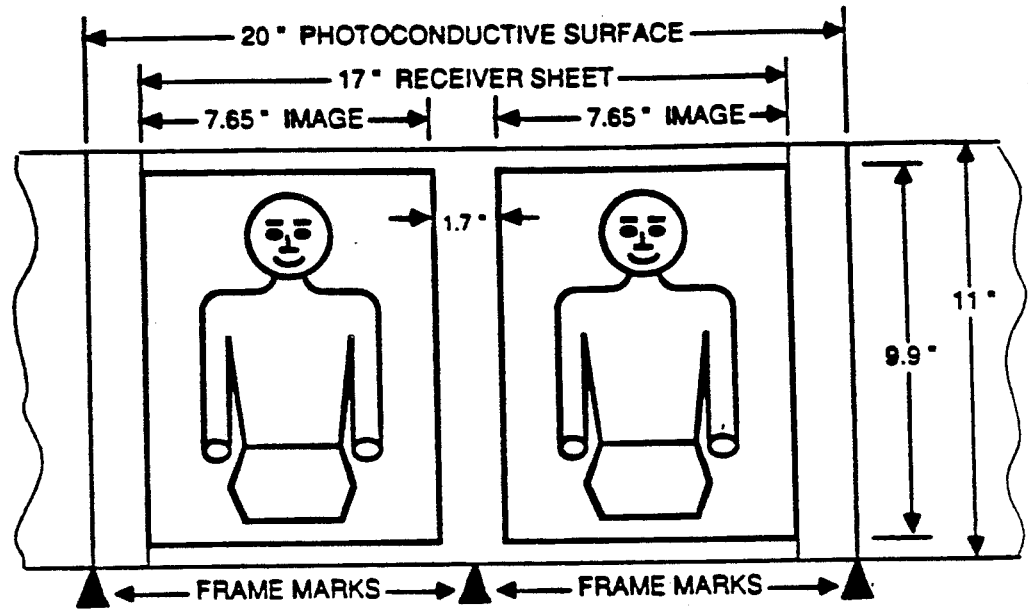
Figure 12:
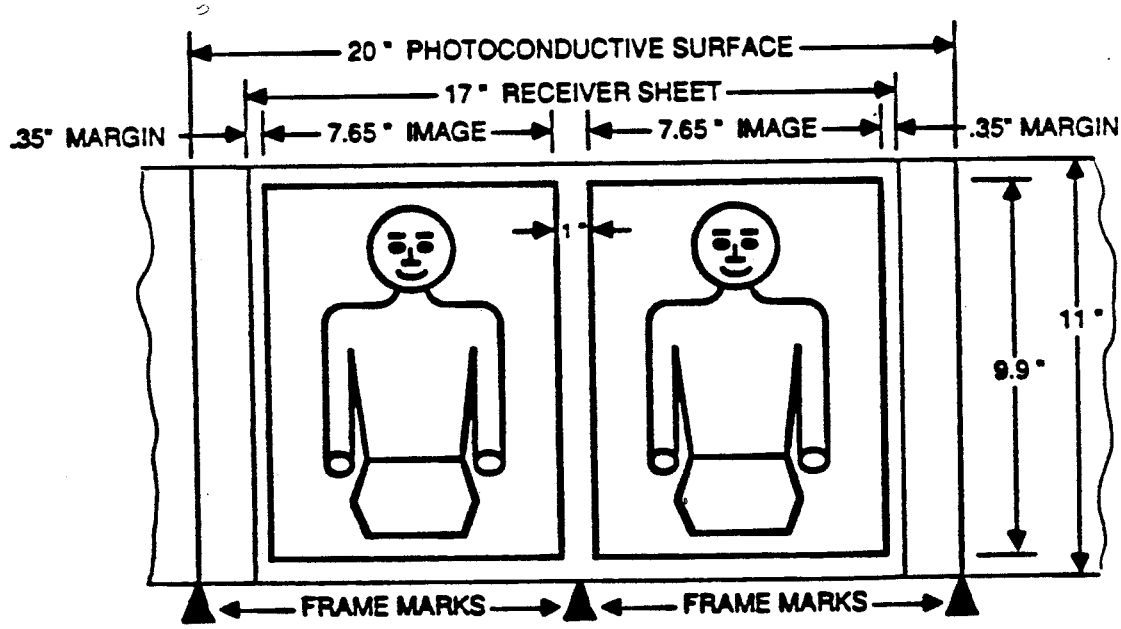

In FIGS. 11 and 12, the documents have been reduced to 90 percent of their original size. In FIG. 11, the images are centered and aligned with a maximum separation. This requires that one of the images be shifted within an interframe so that the images are centered with outside edges aligned with receiver sheet edges, and provides a center margin for binding. FIG. 12 shows the images arranged with a 1 inch separation of the $11 \times 17$ inch receiver sheet. This requires both images to be shifted on the photoconductor by 0.35 inch relative to the frame marks, and provides both a center margin for binding and outer margins. The magnification and amount the at the images are shifted can be pre-determined and pre-programmed to provide the optimum document package.

The invention has been described in detail with particular reference to preferred embodiments thereof, but it will be understood that variations and modifications can be effected within the spirit and scope of the invention.

What is claimed is:

1. Reproduction apparatus for producing on receiver sheets signatures from electrical signals representive of the image content of a plurality of originals to be produced on receiver sheets; said reproduction apparatus comprising:

multi-image electronic memory means having addressable regions for storing such electrical signals defining the image content of a plurality of originals in a first sequence of originals;

means for storing the address information relating to the storage location of each original in said memory means;

means cooperative with said address storing means for selectively retrieving from said memory means the stored electrical signals of individual originals seriatim in a scheduled order different from said first sequence such that reproduced images of the originals are located on respective sides of receiver sheets in regions such that multiple stacked receiver sheets can be folded between images and nested to form a collated booklet with the pages properly sequenced; and writer means for producing said original images in the order the control information is retrieved from said memory means onto receiver sheets transported past the writer means.

2. Booklet production apparatus comprising:

image memory means for storing electrical signals representative of a plurality of original pages;

means for causing the electrical signals to be stored in said memory means in a first sequence;

means for reading out the stored signals from the memory means;

means for image forming on receiver sheets in accordance with the electrical signals read out from said memory means;

means for storing control data for selecting the electrical signals stored in said image-defining memory means;

means for controlling said reading out means in accordance with stored control data, and for providing the electrical signals to said image forming means seriatim in a sequence different from said first sequence such that at least two page images are produced on a receiver sheet in respective arrangement of images so that, when nested, the receiver sheets can be folded so as to read like a book with the pages properly sequenced.

3. Reproduction apparatus for producing signature sets from electrical control information signals defining document images to be produced on receiver sheets; said reproduction apparatus comprising:

multi-image electronic memory means having addressable regions for storing control information signals respectively defining a plurality of document images in page number order;

means for storing the address information relating to the location of document images in said memory means;

means cooperative with said address storing means for selectively retrieving from said memory means the control information of document images seriatim in a scheduled order such that document images are located on respective sides of receiver sheets in regions such that multiple stacked receiver sheets can be folded between images to form a pamphlet with the pages properly sequenced; and writer means for printing said document images in the order the control information is retrieved from said memory means onto receiver sheets transported past the writer means.

4. Booklet production apparatus comprising:

image memory means for storing image-defining information of a plurality of images;

means for causing image-defining information to be stored in said memory means in page number order;

means for reading out the image-defining information from the memory means;

means for image forming on a sheet in accordance with the image-defining information read out from said memory means by said reading out means;

control data memory means for storing control data for selecting the image-defining information stored in said image-defining memory means;

means for controlling said reading out means in accordance with control data stored in said control data memory means, and for providing the image-defining information to said image forming means seriatim so as to read out the desired image-defining information such that the sheets can be folded so as to read like a book with the pages properly sequenced.

* * * * *